United States Patent [19]
Scharfen

[11] Patent Number: 4,747,609
[45] Date of Patent: May 31, 1988

[54] CHUCK WITH TWO OPPOSITELY DISPOSED CLAMPING JAWS

[75] Inventor: Hans Scharfen, Meerbusch, Fed. Rep. of Germany

[73] Assignee: Paul Forkardt GmbH & Co. KG, Düsseldorf, Fed. Rep. of Germany

[21] Appl. No.: 58,559

[22] Filed: Jun. 5, 1987

[30] Foreign Application Priority Data

Jun. 6, 1986 [DE] Fed. Rep. of Germany ....... 3619145

[51] Int. Cl.$^4$ ............................................. B23B 31/18
[52] U.S. Cl. ........................................... 279/4; 279/5; 279/121
[58] Field of Search ................ 279/4, 121, 112, 117, 279/5, 106, 110

[56] References Cited

U.S. PATENT DOCUMENTS

| | | | |
|---|---|---|---|
| 1,373,789 | 4/1921 | Barker | 279/5 |
| 2,587,893 | 3/1952 | Pridy et al. | 279/4 |
| 2,779,601 | 1/1957 | Skillin | 279/4 |
| 2,948,540 | 8/1960 | Garberding | 279/4 |
| 2,948,541 | 8/1960 | Reich | 279/4 |
| 4,411,440 | 10/1983 | Becker | 279/5 |

FOREIGN PATENT DOCUMENTS

707698 1/1980 U.S.S.R. .................................. 279/4

Primary Examiner—Gil Weidenfeld
Assistant Examiner—Daniel W. Howell
Attorney, Agent, or Firm—Becker & Becker, Inc.

[57] ABSTRACT

A chuck with two oppositely disposed clamping jaws, each of which includes a base jaw and a top jaw. The base jaws are guided in an annular chuck body that has a central clamping space in such a way as to be movable in a radial direction. Each base jaw is driven by a wedge-type member that is mounted in the chuck body in such a way as to be essentially axially movable. In order to provide such a centrally clamping two-jawed chuck with a small overall axial length and a large clamping space, each wedge-type member is driven by a piston of a pressure-medium cylinder. The stroke movements of the two pistons are automatically synchronized by a mechanical coupling element that is disposed in the chuck body parallel to the clamping axis of the two clamping jaws. The coupling element is preferably a coupling shaft. Each base jaw can be provided with a rotatably mounted intermediate jaw, but at least one of the latter being mounted in such a way as to be rotatable via a pivot drive.

2 Claims, 5 Drawing Sheets

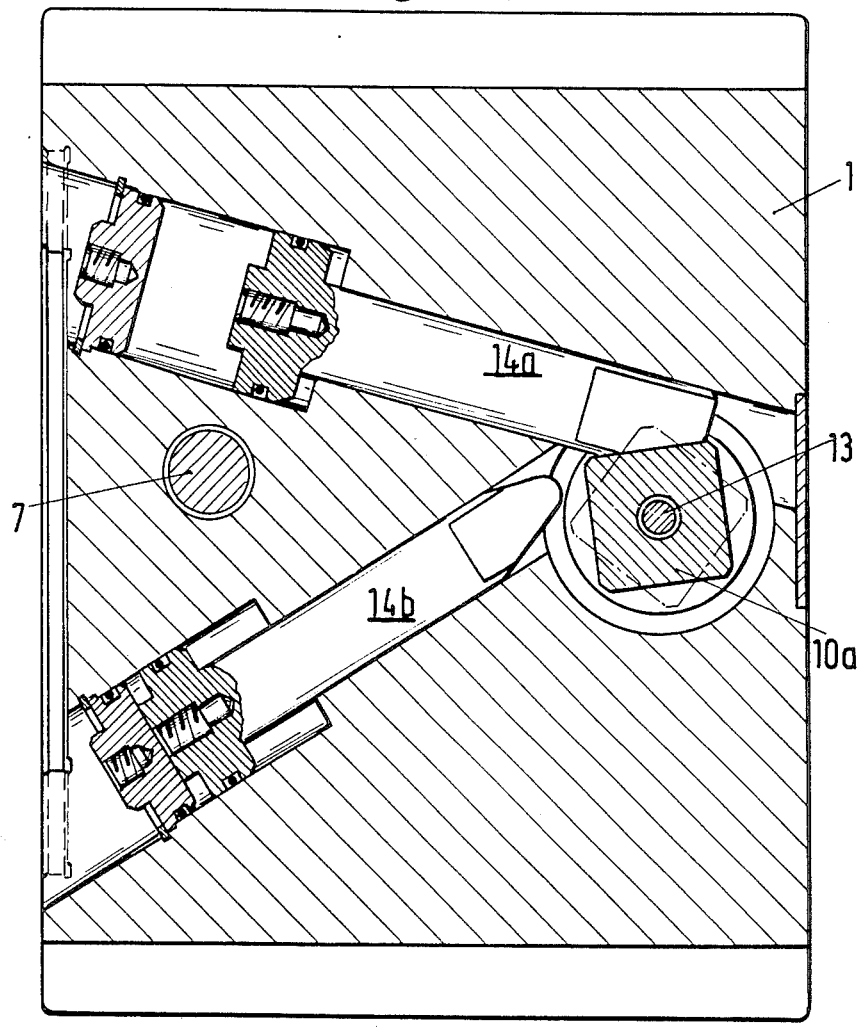

CHUCK WITH TWO OPPOSITELY DISPOSED CLAMPING JAWS

BACKGROUND OF THE INVENTION

1. Field of the Invention

The present invention relates to a chuck with two oppositely disposed clamping jaws, each of which comprises a base jaw and a top jaw, with the base jaws being guided in an annular chuck body that has a central clamping space in such a way as to be movable in a radial direction, and with each base jaw being centrally driven by a wedge-type member that is mounted in the chuck body in such a way as to be essentially axially movable.

2. Description of the Prior Art

Chucks of this general type are known. Projecting workpieces are held with such chucks, whereby the workpieces, which are disposed in the central clamping space of the annular chuck body, are held in such a way by the clamping jaws, which are disposed radially in the annular chuck body, that clamping jaws which extend beyond the end face of the chuck body are avoided. Clamping jaws that extend beyond the end face of the chuck body are subjected to a great expansion due to clamping and centrifugal forces.

With the chucks of the aforementioned type, the clamping force of the clamping jaws is introduced directly into the annular chuck body in the clamping plane, so that the reaction forces in the chuck body, in contrast to the situation where projecting clamping jaws are present, corresponds to the clamping force without amplification due to the length of lever arms.

A drawback of the heretofore known chuck constructions of the aforementioned type is that a central piston is used that leads to an undesired increase of the overall axial length and hence, while at the same time reducing the clamping space in the annular chuck body, leads to an increase of the maximum torque that occurs during machining and that is exerted upon the spindle.

It is an object of the present invention to provide a centrally clamping, two-jaw chuck of the aforementioned general type that has a short, overall axial length and a large clamping space.

BRIEF DESCRIPTION OF THE DRAWINGS

This object, and other objects and advantages of the present invention, will appear more clearly from the following specification in conjunction with the accompanying schematic drawings, in which:

FIG. 5 is a cross-sectional view taken along the line V—V in FIG. 4 in the region of the pivot drive.

SUMMARY OF THE INVENTION

Figure 1:
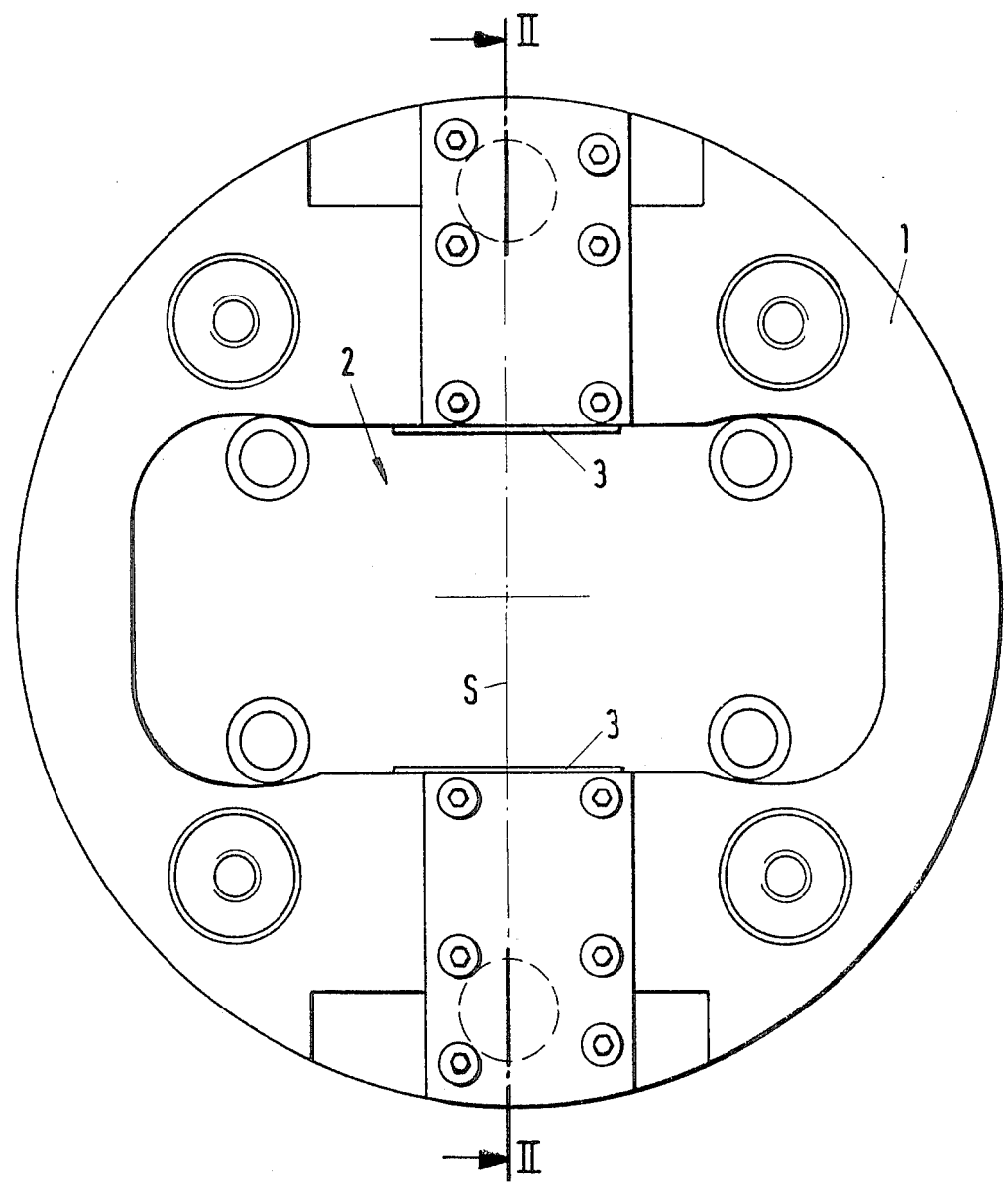
FIG. 1 is an end view of a first exemplary embodiment of the inventive chuck, without top jaws.

The chuck of the present invention is characterized primarily in that each wedge-type member is driven by a piston of a pressure-medium cylinder, and in that the stroke movements of the two pistons are automatically synchronized by a mechanical coupling element that is disposed in the chuck body parallel to the clamping axis of the two clamping jaws.

The advantage of the inventive construction is that the pressure-medium cylinders utilized for driving the two oppositely disposed clamping jaws require little space, and can be advantageously accommodated in the annular chuck body. Due to the inventive automatic synchronization of the stroke movements of the two pistons with the aid of a mechanical coupling element that is disposed in the chuck body parallel to the clamping axis of the two clamping jaws, a central clamping movement is achieved despite the use of respective pressure-medium cylinders to drive each of the two clamping jaws. In particular, this is accomplished with little structural expense, and requires only little space, so that, taken as a whole, a centrally clamping two-jaw chuck is provided that has a short overall axial length with a large clamping space.

Pursuant to a further feature of the present invention, the coupling element is embodied as a coupling shaft, the ends of which are provided with teeth that mesh in appropriate toothed racks that are formed on piston rods connected to the pistons. In a straightforward manner, the inventive coupling shaft can be rotatably mounted in the chuck body, so that the inventive automatic synchronization can be achieved with straightforward technical means.

Pursuant to the present invention, each end of the coupling element, independently of the other end, is adjustable relative to the pertaining piston rod so as to be free of play, so that despite unavoidable manufacturing tolerances, a centrally clamping chuck is provided, the clamping center of which is disposed on the axis of rotation of the chuck.

Pursuant to a preferred specific embodiment, the coupling shaft is mounted in the chuck body only in the region of its ends. The bearings for effecting this mounting are adjustable relative to the pertaining toothed rack, so that the required compensation for play can be achieved.

In order in a known manner, to further build the inventive chuck with its oppositely disposed clamping jaws into a so-called pivot chuck, with the aid of which tools can be machined at several ends or along several intersecting axes in a single insertion, it is finally proposed pursuant to the present invention to provide each base jaw with a rotatably mounted intermediate jaw, with at least one of these intermediate jaws being rotatable via a pivot drive. Also with this further specific embodiment of the inventive chuck in the form of a centrally clamping pivot chuck, the advantage of a small overall axial length and a large central clamping space is retained.

Further specific features of the present invention will be described in detail subsequently.

DESCRIPTION OF PREFERRED EMBODIMENTS

Referring now to the drawings in detail, both of the illustrated embodiments involve a centrally clamping chuck that has an annular chuck body 1; the latter extends around a central clamping space 2 in which the workpiece that is to be machined or otherwise handled at any given time is held by two clamping jaws, each of which comprises a base jaw 3 and a top jaw that is not illustrated in the drawings. The two base jaws 3, which are disposed across from one another, are guided in the chuck body 1 in such a way as to be movable in a radial direction, as can be seen in particular in FIGS. 2 and 4.

Each base jaw 3 is moved by a wedge-type member 4 that is mounted in the chuck body 1 in such a way as to be movable in an essentially axial direction; the wedge-type member 4 cooperates with a corresponding inclined wedge surface of the base jaw 3. Consequently, an axial movement of the wedge-type members 4 results in movement of the associated base jaws 3 in the radial direction. By means of a positive engagement between the wedge-type members 4 and the base jaws 3 in the vicinity of the inclined wedge surfaces, not only a radial feed movement but also a radial return movement of the base jaws 3 can take place when the wedge-type members 4 are moved in the axial direction.

Operation of each wedge-type member 4 is respectively effected by a piston 5 that is connected to the pertaining member 4 and is guided in a sealed manner in an appropriate cylinder space 6 of the chuck body 1. Supply of hydraulic fluid or other pressure medium to the cylinder space 6 is effected via lines or holes in the chuck body 1; for ease of illustration, these lines or holes are not illustrated. Supply of pressure medium is also effected via a transfer chamber of known construction that is similarly not illustrated in the drawings.

The stroke movements of the two pistons 5 are automatically synchronized by a mechanical coupling element that is disposed parallel to the clamping axis S of the two clamping jaws in the chuck body 1. In both of the illustrated embodiments, this coupling element is embodied as a coupling shaft 7. Only at its two ends is this coupling shaft 7 rotatably mounted in the chuck body 1 via bearing bushings 8; furthermore, in the region of each of these two ends, the shaft 7 is provided with teeth 7a that in the illustrated embodiments are in the form of linear, trapezoidal teeth. A respective toothed rack 9 meshes with the teeth 7a; each rack 9 is connected to an associated piston 5. This meshing arrangement is shown particularly clearly in FIG. 3.

Each end of the coupling shaft 7, which acts as the coupling element, independently from the other end, can be adjusted relative to the pertaining toothed rack 9 so as to be free of play, with this advantageously being accomplished by making the bearing bushing 8 movable relative to the pertaining rack 9. In this way, not only is a freedom of play between the pertaining teeth 7a and the pertaining tooth rack 9 achieved, but it is also possible to adjust a starting position of the two pistons 5 that are interconnected by the coupling shaft 7, thus resulting in a central movement, of the base jaws 3, that has a center disposed on the axis of rotation D of the chuck.

Figure 2:
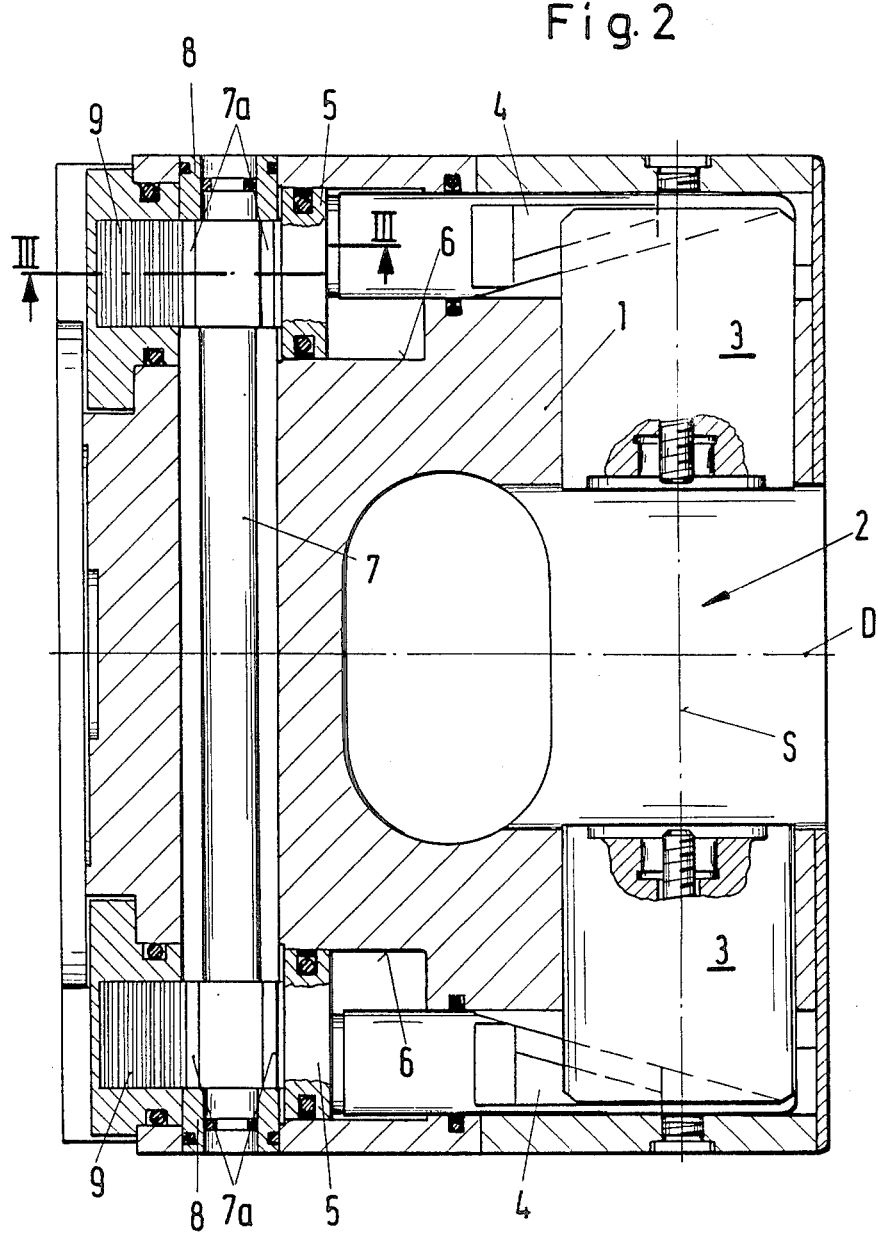
FIG. 2 is a partially broken-away, cross-sectional view taken along the line II—II in FIG. 1.
Figure 3:
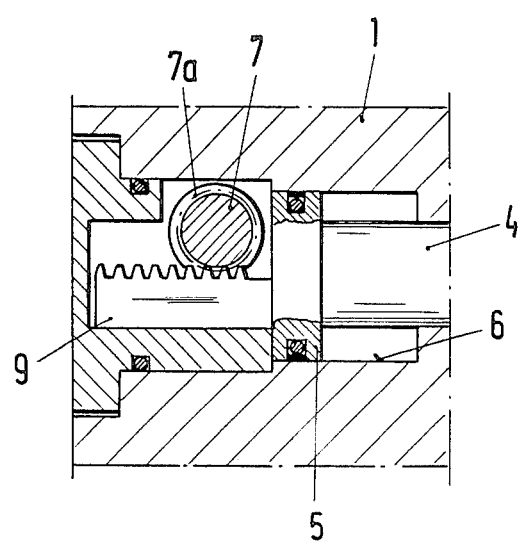
FIG. 3 is a partial cross-sectional view taken along the line III—III in FIG. 2.
Figure 4:
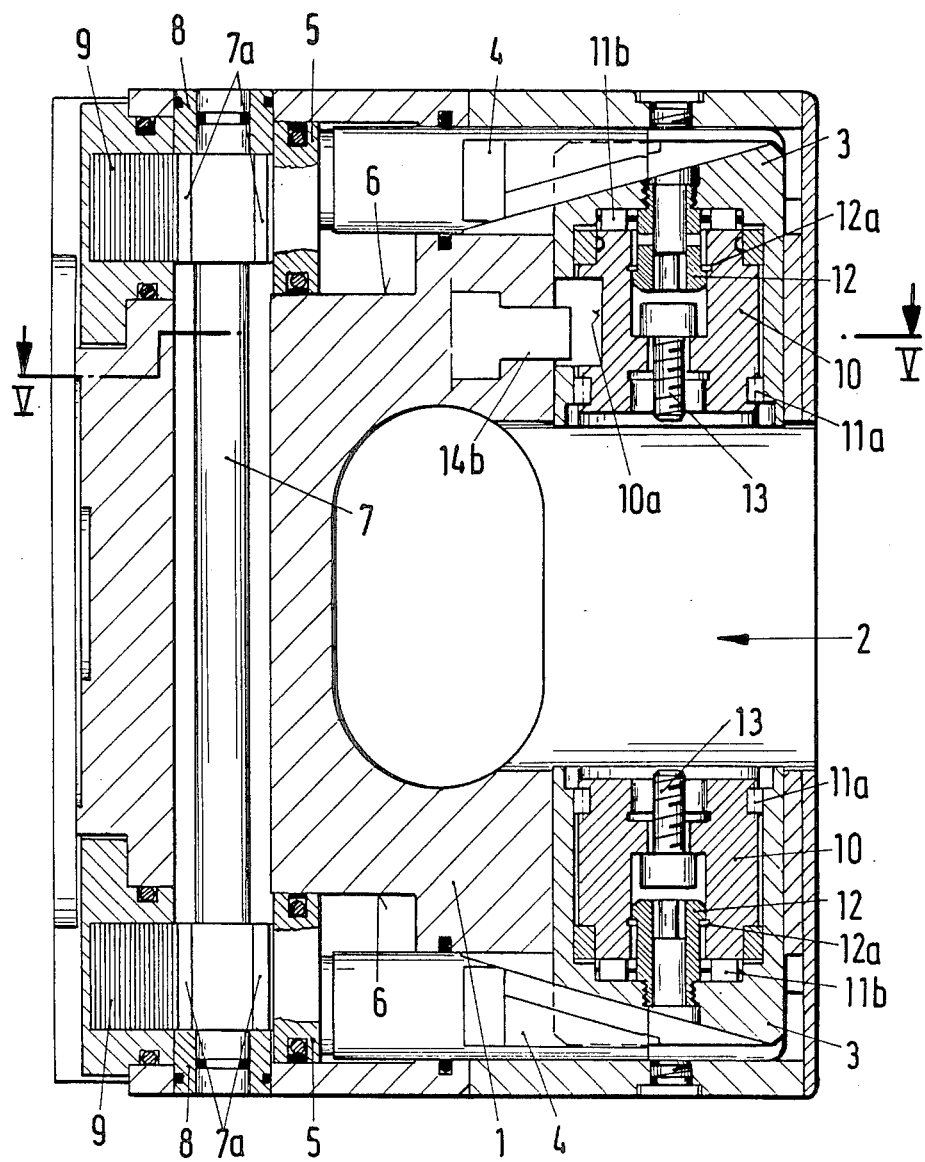
FIG. 4 is a cross-sectional view of a second exemplary embodiment of the inventive chuck in the form of a pivot chuck.

Whereas in the first embodiment illustrated in FIGS. 1 to 3, the base jaws 3 are guided in the chuck body 1 in such a way as to be radially movable yet not rotatable, the second embodiment illustrated in FIGS. 4 and 5 shows an embodiment where each base jaw 3 is provided with a rotatably mounted intermediate jaw 10. In this exemplary embodiment, each intermediate jaw 10 is rotatably mounted in a central hollow chamber of the base jaw 3 via a radial bearing 11a and an axial bearing 11b. In addition, each intermediate jaw 10 is kept from falling out by means of a holding screw 12 and a retaining ring 12a. This mounting and retention can be seen in FIG. 4, which also shows a securing bolt 13 that is disposed in the intermediate jaw 10 and serves for securing the non-illustrated top jaw to the intermediate jaw 10.

In the embodiment illustrated in FIGS. 4 and 5, one of the intermediate jaws 10 is provided with a pivot drive, which is illustrated schematically in FIG. 5. This pivot drive is known per se and, via two push rods 14a and 14b, which are operated by pressure medium, acts upon a multi-sided portion 10a that is formed on the intermediate jaw 10. By successively actuating the push rods 14a and 14b, it is possible to rotate the intermediate jaw 10 about a predetermined angle, as indicated by dot-dash lines in FIG. 5. The rotational movement applied to one of the intermediate jaws 10 is transferred to the other intermediate jaw 10 via the workpiece that is clamped between the clamping jaws, so that it is necessary to provide only one pivot drive.

As illustrated in particular in FIG. 4, with the second embodiment an automatic synchronization of the stroke movements of the two pistons 5 that serve for driving the clamping jaws is also effected with the aid of a coupling element that is embodied as the coupling shaft 7. The construction of this automatic synchronization corresponds to the construction described in connection with the embodiment illustrated in FIG. 2.

The present invention is, of course, in no way restricted to the specific disclosure of the specification and drawings, but also encompasses any modifications within the scope of the appended claims.

What I claim is:

1. A chuck with two oppositely disposed clamping jaws that operate along a clamping axis, each of said clamping jaws comprising a base jaw and a top jaw, with said base jaws being guided in an annular chuck body, which has a central clamping space, in such a way as to be movable in a radial direction, and with each of said base jaws being driven by a wedge-type member that is mounted in said chuck body in such a way as to be essentially axially movable, said chuck further comprising:

for each of said wedge-type members, a pressure-medium cylinder having a piston for driving that wedge-type member, whereby each of the two pistons carries out a stroke movement; and a mechanical coupling element that is disposed in said chuck body parallel to said clamping axis of said two clamping jaws, with said coupling element automatically synchronizing said stroke movements of the two pistons;

each of said pistons being provided with a piston rod on which a toothed rack is formed; and in which said coupling element is in the form of a coupling shaft that has two ends, in the vicinity of each of which respective teeth are provided that mesh with a given one of said toothed racks to effect said synchronization.

2. A chuck body according to claim 1, in which each of said base jaws is provided with a rotatably mounted intermediate jaw; and which includes pivot drive means disposed in said chuck body for rotating at least one of said intermediate jaws.

* * * * *